United States Patent [19]
Pine

[11] Patent Number: 6,154,334
[45] Date of Patent: *Nov. 28, 2000

[54] INFORMATION RECORDING ON A MULTITRACK RECORD CARRIER

[75] Inventor: Gregory E. Pine, Breda, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,052

[22] Filed: Jul. 15, 1997

[30] Foreign Application Priority Data

Jul. 22, 1996 [EP] European Pat. Off. ............. 96202074

[51] Int. Cl.$^7$ ................................................. G11B 15/48
[52] U.S. Cl. ........................................ 360/74.1; 360/48
[58] Field of Search ..................................... 360/48, 74.1

[56] References Cited

U.S. PATENT DOCUMENTS

| | | | |
|---|---|---|---|
| 4,318,141 | 3/1982 | Haynes | 360/77 |
| 5,485,321 | 1/1996 | Leonhardt et al. | 360/48 |
| 5,572,378 | 11/1996 | Schwarz et al. | 360/48 |

*Primary Examiner*—Hoa T. Nguyen
*Assistant Examiner*—Dan I. Davidson

[57] ABSTRACT

A recording apparatus for a multitrack longitudinally extending record carrier records information by moving forward and reverse along various tracks in successive sub portions of the record carrier in a serpentine manner. This makes it possible to quickly access a desired portion of a recorded motion picture simply by changing tracks instead of having to wait until all intervening portions of the motion picture have been scanned. The apparatus is thus well suited to multimedia recording.

3 Claims, 3 Drawing Sheets

INFORMATION RECORDING ON A MULTITRACK RECORD CARRIER

BACKGROUND OF THE INVENTION

1. Field of the Invention

The invention relates to an apparatus for recording an information signal in a plurality of tracks running in the longitudinal direction of a longitudinal record carrier, such as a magnetic record carrier, to a record carrier and to a method of recording. An apparatus as defined in the foregoing is known from U.S. Pat. No. 4,318,141, document D1 in the list of related documents that can be found at the end of this description.

2. Description of the Related Art

Conventional organisation of recording of information signals on a longitudinal record carrier is sequential, with information signals being recorded serially in one or more tracks along the length of the record carrier. Information signals are typically recorded in one or more tracks from the beginning of the record carrier to the end of the record carrier. If the information signal to be recorded is longer than the length of the record carrier, the transport mechanism steps the one or more heads to one or more different tracks and the recording process continues back from the end toward the beginning of the record carrier. Consequently, the multiple tracks are recorded in a serpentine like manner on the record carrier. The known apparatus has the disadvantage of a long access time for accessing a particular portions of the information recorded on the record carrier.

SUMMARY OF THE INVENTION

The invention aims at providing an improved apparatus for recording an information signal on a record carrier, which results in shorter access times for accessing the information.

The apparatus records an information signal in a plurality of tracks running in the longitudinal direction of a longitudinal record carrier, the apparatus comprising input means for receiving the information signal, signal processing means for processing the information signal so as to put it in a form in which it can be recorded in the plurality of tracks on the record carrier, transport means for transporting the record carrier in a longitudinal forward or reverse direction, writing means for writing the processed information signal in said tracks on the record carrier in a serpentine like manner, starting from a start location viewed in the forward longitudinal direction of the record carrier towards a first end of the record carrier, the apparatus further comprising means for dividing the total length of the record carrier between said start location and said first end of the record carrier into a plurality of sub portions of the record carrier, the writing means being further adapted to write the processed information signal in a first track in a specific forward portion, in the first direction from a first end to a second end of said first portion, the transporting means being further adapted to change the direction of transport to the reverse direction upon reaching the second end of said first portion, the writing means being further adapted to write the processed information signal in a second track in said first portion from said second end towards said first end, the transporting means being further adapted to change the direction of transport to the forward direction upon reaching the first end, the writing means being further adapted to write the processed information signal in a third track in the first portion from said first end towards said second end of said first portion.

The invention is based on the following recognition. By dividing the total length between the start location and said first end of the record carrier into a plurality of sub portions, it is possible to make 'shorter' serpentines by reversing the transport direction of the record carrier upon reaching each end of a portion and switching over to another rack. When a film is recorded in this way, it is possible to easily and quickly access other moments in time in the film by simply changing tracks.

BRIEF DESCRIPTION OF THE DRAWINGS

These and other objects of the invention will become apparent from and further elucidated with reference to the embodiments described in the following figure description, in which.

DETAILED DESCRIPTION OF THE PREFERRED EMBODIMENTS

Figure 1:
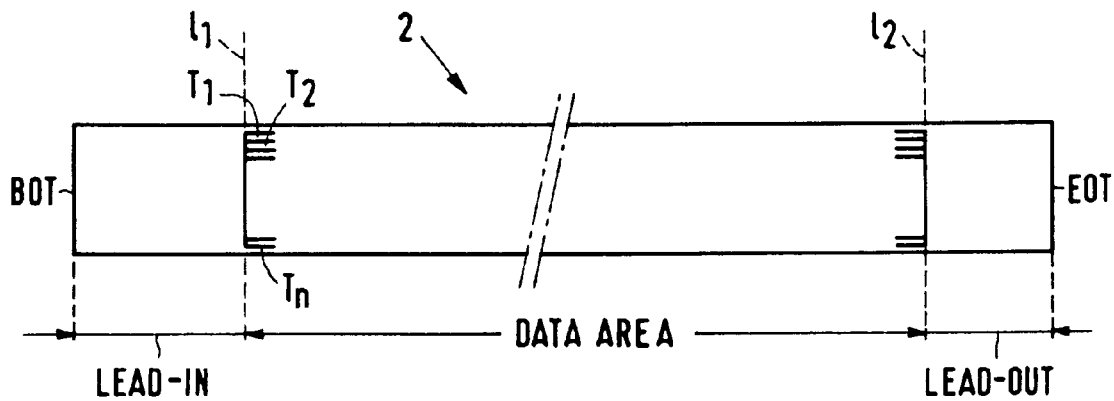
FIG. 1 shows schematically the record carrier.

FIG. 1 schematically shows a record carrier 2, over its total length. The tart end of the record carrier 2 is indicated by BOT (beginning-of-tape) and the final end is indicated by EOT (end-of-tape). A lead-in portion and a lead-out portion are shown, being the portions between the start end (BOT) of the record carrier and the line $1_1$ and the final end (EOT) of the record carrier and the line $1_2$ respectively. A data area for recording the information signal is available between the lead-in portion and the lead-out portion of the record carrier 2.

Tracking signals may be recorded in the record carrier in order to enable recording of the information so as to obtain information tracks $T_1$ to $T_n$, as shown in FIG. 1. Reference is made to the documents D2 to D6 which further describe the tracking signals and the use fo such tracking signal. Where necessary, those documents are assumed to be incorporated reference in the present application.

Figure 2:
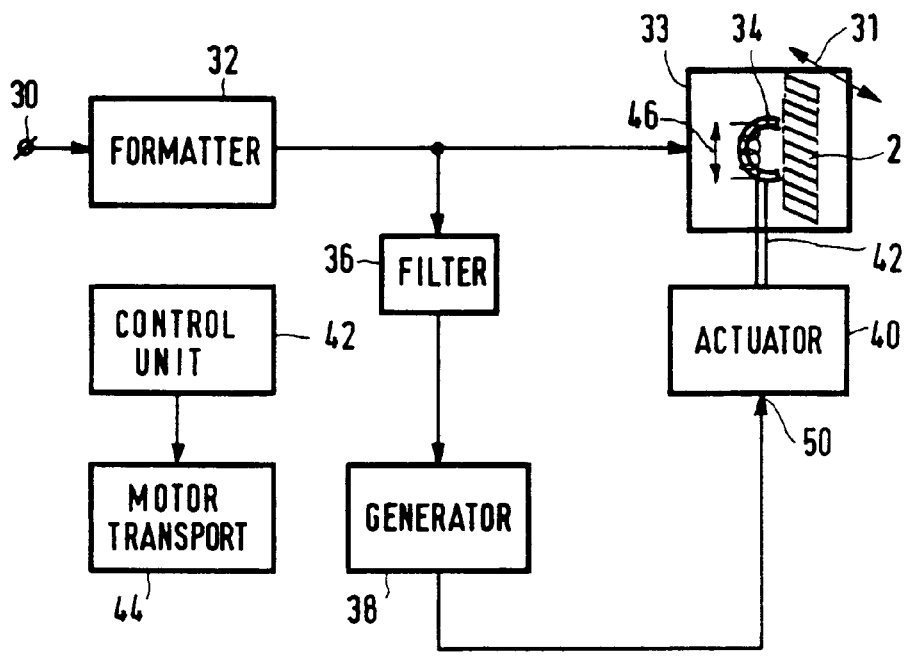
FIG. 2 shows recording apparatus in accordance with the invention.
Figure 3:
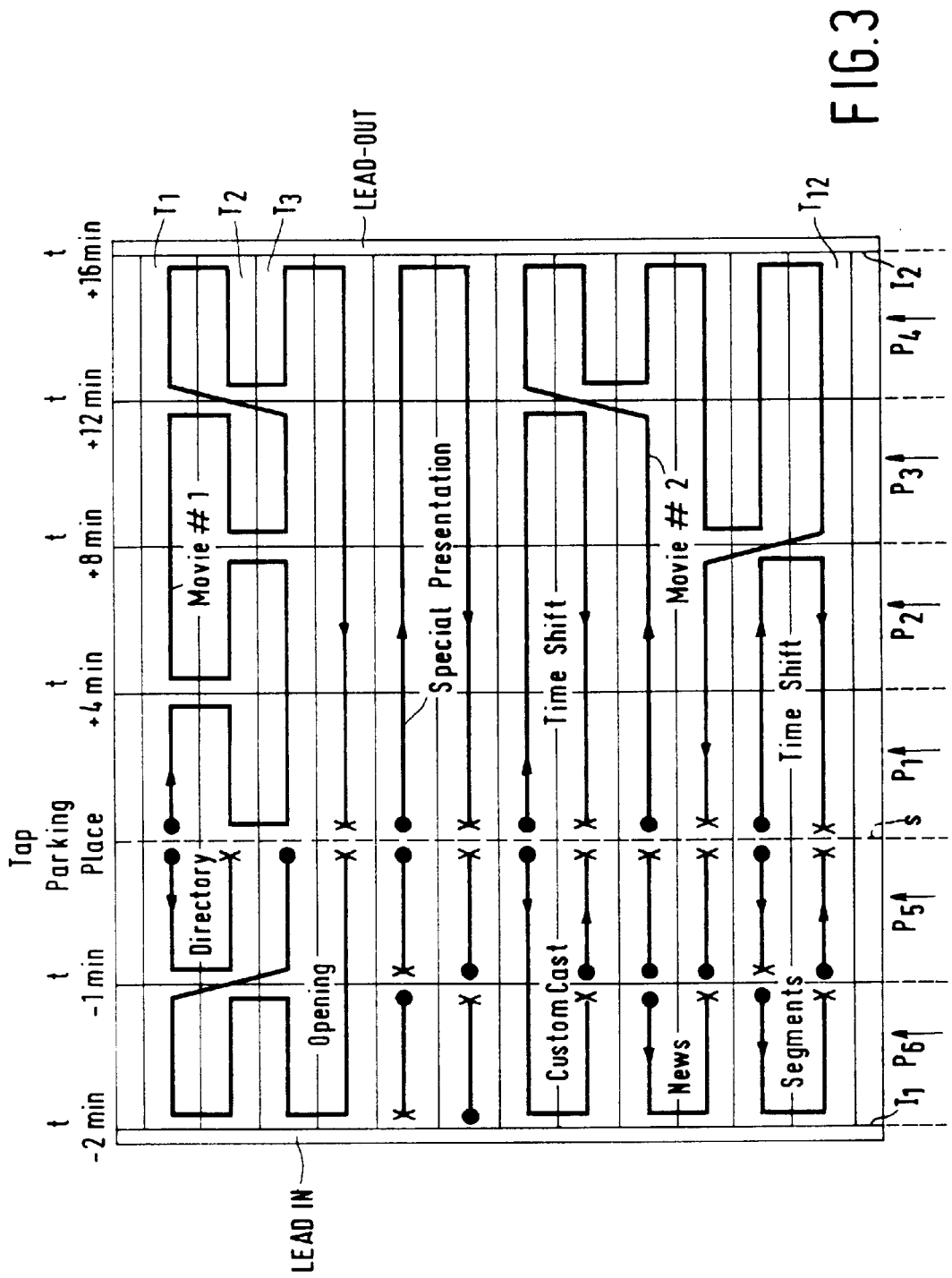
FIG. 3 shows the record carrier as it may be recorded by the apparatus of FIG. 2 in more detail.

FIG. 2 shows an embodiment of an apparatus for recording an information signal on the record carrier 2 of FIG. 1, which has tracking signals prerecorded on it. FIG. 3 shows how the information signal is recorded on the record carrier 2. The apparatus of FIG. 2 has an input terminal 30 for receiving the information signal. The input terminal is coupled to an input of a formatter unit 32, which converts the information signal into a format suitable for recording on the record carrier 2. An output of the formatter unit 32 is coupled to a write unit 33 comprising a write/read head 34. The formatted information signal is supplied to the write/read head 34 and recorded in one of the tracks $T_1, T_2, \ldots T_n$ on the record carrier 1. The record carrier as shown in FIG. 2 is supposed to be transported in directions indicated by the arrow 31.

The head 34 is further adapted to read tracking signals recorded in the record carrier. The tracking signals are supplied to a filter unit 36, which has a bandpass filter characteristic with a centre frequency equal to the specific frequency cf the tracking signals. As the frequency of the tracking signals is low relative to the frequency content of the formatted information signal, it is possible to read the tracking signals from the record carrier, while writing the formatted information signal into the track $T_1$.

A generator unit 38 is present for generating a control signal in response to the tracking signals read by the head 34. This control signal is supplied to an input 50 of an actuator unit 40. The actuator unit 40 actuates a movable mounting 42 on which the head 3,4 is mounted. The movable mounting can have any form. One preferred embodiment of a mounting is described in EP patent application no. 95202926.2, document D2 of the list of related documents, filed recently in the name of applicant, but not yet published. Further, the functioning of the tracking servo mechanism is extensively described in document D6 of the list of related documents.

A control unit 42 is present for controlling a motor transport unit 44. By controlling the motor transport unit, the record carrier 2 is transported in one of the two directions shown by the arrow 31.

FIG. 3 shows an example of the record carrier 2 after having been recorded unit an information signal such as a movie. The width of the record carrier is largely exaggerated in order to better explain the record carrier and the functioning of the apparatus. In total twelve tracks $T_1$ to $T_{12}$ are shown in this example.

As can be seen, the total length of the record carrier between the start point, which is the line s, and the end of the record carrier, which is the line $1_2$, is divided into a number of portions, denoted $P_1$ to $P_4$. The portions are in this example of equal length, which is expressed in time, as being of a length of 4 minutes of recording or reproduction time.

When recording a movie on the record carrier, indicated by movie #1, recording starts in track $T_1$ indicated by the dot, at the start location indicated by the line s. As can be seen, in this example, the start location is not at the beginning of the record carrier but distance away from the beginning of the record carrier. Expressed in recording or reproduction time, the start position is located two minutes away from the beginning of the record carrier, which is the line $1_1$. During recording the first four minutes of the movie, in this example, the record carrier is transported in such direction that recording takes place in the track $T_1$, in the direction towards the end 12 of the record carrier. Thus, a portion of the information signal is recorded in that part of the track $T_1$ lying in the first portion $P_1$. After four minutes have lapsed, the transport direction of the record carrier is reversed. Further, the head is positioned so that recording continues in track $T_2$ in a direction towards the start position, that is the line s. Thus, a portion of the information signal is recorded in that part of the track $T_2$ lying in the first portion $P_1$. Upon reaching the start position, the transport direction of the record carrier is again reversed. Further, the head is replaced so that recording continues in the track $T_3$ in a direction towards the end, the line $1_2$, of the record carrier. Recording continues for the next 8 minutes, until the transport direction of the record carrier is again reversed. Thus, a portion of the information signal is recorded in that part of the track $T_3$ lying in the portions $P_1$ and $P_2$. The head is positioned in cooperation with the track $T_2$ and recording continues for 4 minutes, until the head reaches the boundary line between the portions $P_1$ and $P_2$. Next, upon reaching the said boundary line, the head is positioned above the track $T_1$ and the transport direction of the record carrier is reversed. The next portion of the information is thus recorded in that part of the track $T_1$ located in the portion $P_2$. Recording continues in that part of the track $T_1$ located in the portion $P_3$. Next, upon reaching the boundary line between the portions $P_3$ and $P_4$, the head is positioned above the track $T_2$ and the transport direction of the record carrier is reversed again. Recording continues in the track $T_2$, until the boundary between the portions $P_2$ and $P_3$ is reached. The head is positioned above the track $T_3$ and the transport direction is reversed. After having reached the boundary between the portions $P_3$ and $P_4$, the head is positioned above the track $T_1$ so that the final part of the track $T_1$ can be filled with recorded information. Upon reaching the end of the record carrier, which is the boundary line $1_2$, separating the information area from the lead out area, the head is positioned above the track $T_2$ and the direction of transport is reversed, so that the final part of the track $T_2$ can be filled with information. Upon reaching the boundary between the portions $P_3$ and $P_4$, the head is positioned above the track $T_3$ and the direction of transport of the record carrier reversed so that the final part of the track $T_3$ can be filled with information.

Upon again reaching the end of the record carrier, the head is positioned above the track $T_4$ and the direction of transport reversed so that the information can be recorded in the track $T_4$. In the present example, the movie is 64 minutes long, so that the remaining part of the movie can be recorded in the track $T_4$, until the head has reached the starting position s.

Upon programming a movie for recording in the apparatus, the length of the movie is inputted in any form into the apparatus. Using this information, the apparatus is capable of choosing such a recording path through the various portion; that the start and the end of the recording are at the same position viewed in the length direction of the record carrier, namely the position indicated by the line s.

In another embodiment, the information signal itself comprises information about the length of the movie. The apparatus is now capable of retrieving this length information from the information signal received, so that the apparatus, is again capable of choosing the appropriate recording path through the various portions.

Other programs may not require the specific recording method as described above for movie # 1. As an example, another program, denoted 'special presentation' is recorded in the well known way in the tracks $T_5$ and $T_6$ and again another program, denoted 'time shift' is recorded in the portions $P_1$, $P_2$ and $P_3$ of the tracks $T_7$ and $T_8$ and another program also denoted 'time shift' is recorded in the portions $P_1$ and $P_2$ of the tracks $T_{11}$ aid $T_{12}$.

The program denoted 'movie # 2' is also characterized by the specific recording method as described above. The method is advantageously used in order to fill the empty portions in the tracks $T_7$, $T_8$, $T_{11}$, and $T_{12}$ behind the programs denoted 'time shift'.

As has been said earlier, the start location, indicated by the line s, is not at the beginning of the record carrier, but at a distance therefrom. This enables the recording of further programs in the area between the beginning of the record carrier, indicated by the line $1_1$, and the start location, indicated by the line s. Those recordings can also start at the start location. The part of the record carrier between the beginning $1_1$ and the start location s of the record carrier is also divided into a number of, in this example two, portions $P_5$ and $P_6$ of one minute of recording-reproduction time each. As can be seen in FIG. 3, a directory (table-of-contents) is recorded in the parts of the tracks $T_1$ and $T_2$ inside the portion $P_5$. The directory starts at the start location s and can be read by scanning the track $T_1$ in the second direction, that is from right to left in FIG. 3. Upon reaching the boundary between the portions $P_5$ and $P_6$, the direction of transport of the record carrier is reversed and the head is positioned above the track $T_2$, so that the remaining part of the direction recorded in the track $T_2$ and within the portion $P_5$ can be read. Positioning the directory in the way as shown has the advantage that, after having recorded a movie, such as the movie#1, the directory can be updated very quickly. After having terminated the recording of the movie#1, the head is positioned on track $T_4$, at the start position line s. Updating, the directory can be realized by repositioning the head in the vertical direction as seen in FIG. 3 towards a position where the head is positioned above the track $T_1$, so that the directory can quickly be updated, whilst after terminating the update, the head is again at the start location, line s.

The remaining part of the record carrier at the left hand side of the line s can be used for recording news items, as shown in the tracks $T_9$ and $T_{10}$.

Figure 4:
FIG. 4 is a schematic picture of a TV screen showing various subjects for priority setting by an user.
Figure 4:
Figure 4:
Figure 4:
Figure 4:
Figure 4:
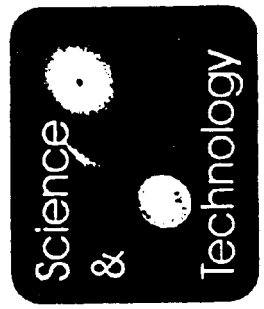
Figure 4:
Figure 4:
Figure 4:
Figure 4:
Figure 4:
Figure 4:
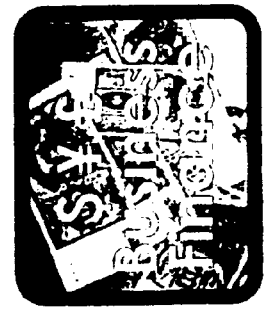

The apparatus could further be used in combination with a service provider for supplying services on demand of a customer. This is called 'custom-cast'. A custom-cast service provider may be capable of transmitting a so-called 'custom cast' message to the user. This message is received via some transmission chain and recorded automatically on the record carrier, as shown in FIG. 3 by the two items denoted 'customs cast' in the tracks $T_7$ and $T_8$ in the portions $P_5$ and $P_6$. The user may switch the apparatus into a reproduction mode for a reproduction of the 'custom cast' information recorded. This could lead to a screen as shown in FIG. 4. This screen shows all subjects of information that can be chosen by the user. Upon choosing a subject and a corresponding priority, the priorities will be retransmitted to the service provider, which will transmit at a later moment information regarding the items chosen. Those items can be recorded automatically on the record carrier, such as the items in the tracks $T_{11}$ and $T_{12}$ denoted 'segments', for a later retrieval.

More specifically, the items are recorded such that on the record carrier the items having the highest priority are recorded first, and items having a lowe,r priority are recorded 'later', in the sense that upon starting the reproduction mode by the user for those items, tie items having the highest priority are reproduced first and the items having a lower priority are reproduced later.

The service provider is also capable of transmitting general information as regards programs and movies that can be obtained from the service provider. Such general information is recorded automatically on the record carrier, denoted by 'opening', in the tracks $T_3$ and $T_4$ in the portion $P_5$ and the tracks $T_1$ to $T_4$ in the portion $P_6$. Further, commercials specifically related to the chosen priorities can be supplied by the service provider and recorded in the tracks $T_6$ and $T_7$, in the portions $P_5$ and $P_6$.

Whilst the invention has been described with reference to preferred embodiments thereof, it is to be understood that these are not limitative examples. Thus, various modifications may become apparent to those skilled in the art, without departing from the scope of the invention, as defined by the claims. As an example, the invention has been described with reference to a recording of an information signal by one head in one track on a record carrier. It should however be noted that the invention is equally well applicable to apparatuses in which the information is recorded using a plurality of heads in a plurality of tracks. The apparatus described is very well suitable in multi-media applications, as it enables an automated cooperation with a service provider's network.

Related Documents (D1) U.S. Pat. No. 4,318,141
(D2) EP pat. appln. no. 95202926.2 (PHN 15.520), filing date Oct. 30, 1995
(D3) EP pat. appln. no. 95203028.6 (PHN 15.543), filing date Nov. 8, 1995
(D4) EP pat. appln. no. 95203029.4 (PHN 15.545), filing date Nov. 8, 1995
(D5) EP pat. appln. no. 95203192.0 (PHN 15.563), filing date Nov. 21, 1995
(D6) EP pat. appln. no. 95203380.1 (PHN 15.594), filing date Dec. 12, 1995

What is claimed is:

1. An apparatus for recording an information signal in a plurality of parallel tracks running in the longitudinal direction on a longitudinally extending record carrier, said apparatus comprising:

signal processing means for receiving and processing the information signal into a format adapted to being written on the tracks of the record carrier;

write means for writing the processed information signal on the tracks;

transport means for transporting the record carrier relative to said write means in longitudinally forward and reverse directions;

control means for controlling said write means and said transport means so that the processed information signal is written in said tracks in a serpentine pattern, beginning at a start location and proceeding alternatively in the forward and reverse directions while progressively approaching a first end of the record carrier, the start location being intermediate between said first end of the record carrier and a second end thereof opposite said first end, the forward direction being toward and the reverse direction being away from said first end of the record carrier; said control means being adapted to:

(a) divide the total length of the record carrier between said start location and said first end of the record carrier into a plurality of successive subportions of the record carrier;

(b) with respect to a selected first of said subportions:
 (i) control said write means to write the processed information signal in a first of said tracks in said first subportion, in the forward direction from a first end to a second end of said first subportion;
 (ii) control said transport means to change the direction of transport to the reverse direction upon reaching the second end of said first subportion;
 (iii) control said write means to write the processed information signal in a second track in said first subportion in the reverse direction from said second end to said first end of said first subportion;
 (iv) control said transport means to change the direction of transport to the forward direction upon reaching the first end of said first subportion; and
 (v) control said write means to write the processed information signal in a third track in said first subportion, in the forward direction from said first end to said second end of said first subportion;

(c) with respect to a second of said subportions which directly succeeds said first subportion, and notwithstanding the presence of still unused tracks in said first subportion, directly upon reaching the second end of said first subportion:
  (vi) control said write means to write the processed information signal in said second subportion in a first one of said first, second and third tracks, in the forward direction from a first end to a second end of the second subportion;
  (vii) control said transport means to change to the reverse direction of transport upon reaching the second end of said second subportion;
  (viii) control the write means to write the processed information signal in a second one of said first, second and third tracks in the second subportion, in the reverse direction from the second end to the first end of said second subportion;
  (ix) control the transport means to change to the forward direction of transport upon reaching the first end of said second subportion; and
  (x) control the write means to write the processed information signal in a third one of said first, second and third tracks in the second subportion, in the forward direction from the first end to the second end of said second subportion;
said first one of the first, second and third tracks being the third track, said second one of the first, second and third tracks being the second track, and said third one of the first, second and third tracks being the first track.

2. An apparatus as claimed in claim 1, further adapted to process and record another information signal in tracks starting from said start location and proceeding in the reverse direction towards the second end of said record carrier.

3. An apparatus as claimed in claim 2, wherein the control means is further adapted to
  (a) divide the total length of the record carrier between said start location and said second end thereof into a plurality of further subportions of the record carrier;
  (b) control the write means to write the processed other information signal in the reverse direction in a third subportion lying on the opposite side of the start location from the first subportion;
  (c) control the transport means to change to the forward direction of transport upon reaching the second end of said third subportion;
  (d) control the write means to write the processed other information signal in said third subportion in the forward direction from said second end toward said first end of said third subportion;
  (e) control the transport means to change to the reverse direction upon reaching the first end of said third subportion; and
  (f) control the write means to write the processed other information signal in said third subportion, in the reverse direction from said first end towards said second end of said third subportion.

* * * * *